H. BRANNON.
EYEGLASS REPAIRING DEVICE.
APPLICATION FILED FEB. 3, 1911. RENEWED NOV. 4, 1912.

1,064,606.

Patented June 10, 1913.

Witnesses
Francis A. Pocock
J. J. Williamson

Inventor
H. Brannon

By
H. H. Williamson
Attorney

UNITED STATES PATENT OFFICE.

HARRY BRANNON, OF PHILADELPHIA, PENNSYLVANIA.

EYEGLASS-REPAIRING DEVICE.

1,064,606.   Specification of Letters Patent.   Patented June 10, 1913.

Application filed February 3, 1911, Serial No. 606,334. Renewed November 4, 1912. Serial No. 729,473.

*To all whom it may concern:*

Be it known that I, HARRY BRANNON, a citizen of the United States, residing at Philadelphia, in the county of Philadelphia and State of Pennsylvania, have invented a certain new and useful Improvement in Eyeglass-Repairing Devices, of which the following is a specification.

My invention relates to new and useful improvements in eye glass repairing devices, and has for its object to provide an exceedingly simple and effective device of this character whereby a broken glass of a pair of eye glasses may be temporarily repaired, permitting the eye glasses to be used until a new lens may be prepared.

A further object of the invention is to provide a temporary repair device which will be light in weight yet strong and durable.

A still further object of the invention is to produce a repairing device which may be used upon either lens or may be used with either style of glasses, either spectacle or nose glass.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figures 1, 2:
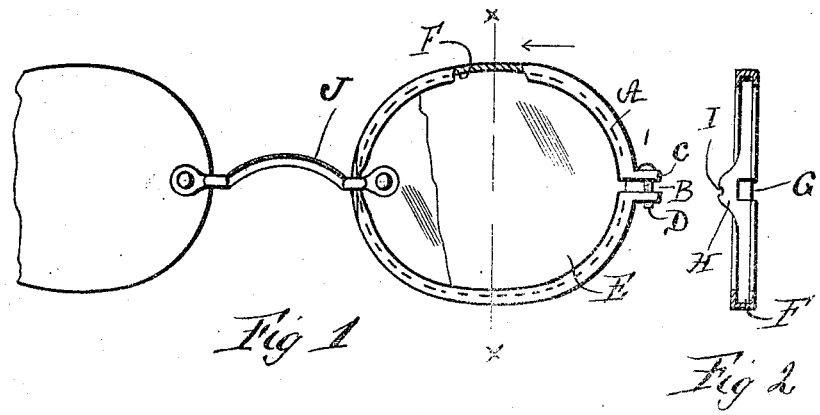
Figures 3, 4:
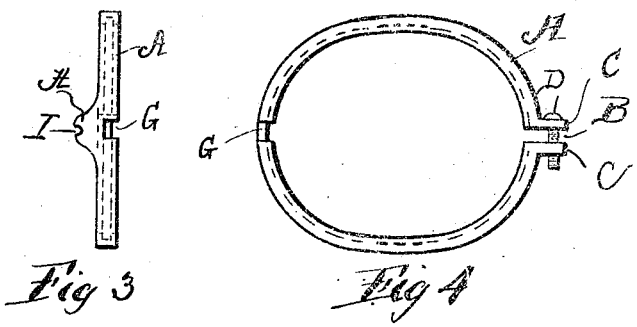
Figure 5:
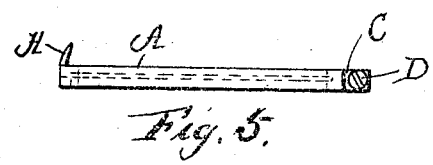

Figure 1, shows a face view of a pair of eye glasses having my repairing device applied thereto, a portion being in section to more clearly show the construction. Fig. 2, a section at the line x—x of Fig. 1, the eye glasses being removed. Fig. 3, an end view of the repairing device. Fig. 4, a side elevation thereof, and Fig. 5, an upper edge view thereof.

In carrying out my invention as here embodied, A represents a repairing device comprising a ring of resilient metal, one end being open as at B at which point the ends of the ring are formed with lugs C, into which is threaded a suitable screw D for drawing the open ends of the ring together. This ring conforms with the lens E of the eye glass and has an internal annular groove F with which the edge of the lens registers, thus preventing the repairing device from sliding from its position after it has been placed upon the lens.

One side of the repairing device is provided with a notch G while the opposite edge has produced therewith a raised portion H which also has a notch I formed therein. These notches receive the bridge J of the eye glass so that the side walls of the notches engage the surface of the bridge, in this way steadying the device and preventing its accidental removal.

As a general rule, nose glasses have a bar running straight from the bridge to the lens, thereby requiring a notch G to permit said bar to pass to the center of the repairing device so that the lens may enter the groove F. In spectacles, the bridge being shaped to the nose, the ends thereof are bent back upon the body of the bridge to carry the lens at the proper line, forming loops some distance back of the lens, therefore requiring the raised portion H of sufficient length to permit the notch I therein to engage the bridge.

From the foregoing description it will be seen that when the lens of a pair of eye glasses is broken, the repairing device may be readily placed about the lens, the broken parts being laid together, and by drawing the ends of the ring together by the screw D the repairing device will be tightly drawn about the lens, holding the parts together so that they may be used temporarily while the new lens is being made.

Of course I do not wish to be limited to the exact details of construction as here shown, as these may be varied within the limits of the appended claims without departing from the spirit of my invention.

Having thus fully described my invention, what I claim as new and useful, is—

1. An eye glass repairing device comprising a ring of resilient metal, said ring having a groove therein and a raised portion formed from one side thereof having a notch therein.

2. In an eye glass repairing device, a split ring having an annular internal groove and a notch, said groove adapted to register with the lens of a pair of eye glasses and said notch adapted to register with the bridge of said eye glasses, and means for drawing the ends of the split ring together.

3. An eye glass repairing device comprising a strong metallic split ring, lugs formed on the ends of the ring, a screw passing through the lugs for drawing the ends of the ring together, and a raised portion formed on one side of the ring having a notch therein with which is adapted to register the bridge of the eye glasses.

4. In an eye glass repairing device, a split metallic ring having an internal annular groove and a notch formed on one side thereof, a raised portion formed upon the opposite side of the ring having a notch therein, said annular groove adapted to register with the lens of a pair of eye glasses and one of the notches adapted to register with the bridge of said eye glasses, lugs formed upon the ends of the split ring, and a screw for drawing the said ends together.

In testimony whereof, I have hereunto affixed my signature in the presence of two subscribing witnesses.

HARRY BRANNON.

Witnesses:
 ANNA C. MORRIS,
 WILLIAM G. MEYER.